(12) United States Patent
Trautenberg

(10) Patent No.: US 10,156,639 B2
(45) Date of Patent: Dec. 18, 2018

(54) COMBINED USE OF DIFFERENT SATELLITE NAVIGATION SYSTEMS

(75) Inventor: Hans L. Trautenberg, Cologne (DE)

(73) Assignee: ASTRIUM GMBH, Taufkirchen (DE)

(*) Notice: Subject to any disclaimer, the term of this patent is extended or adjusted under 35 U.S.C. 154(b) by 1492 days.

(21) Appl. No.: 13/524,227

(22) Filed: Jun. 15, 2012

(65) Prior Publication Data

US 2013/0033398 A1 Feb. 7, 2013

(30) Foreign Application Priority Data

Jun. 16, 2011 (DE) .......... 10 2011 106 589

(51) Int. Cl.
*G01S 19/33* (2010.01)
*G01S 19/25* (2010.01)
*G01S 19/07* (2010.01)
*G01S 19/02* (2010.01)

(52) U.S. Cl.
CPC ............ *G01S 19/33* (2013.01); *G01S 19/258* (2013.01); *G01S 19/02* (2013.01); *G01S 19/07* (2013.01); *G01S 19/256* (2013.01)

(58) Field of Classification Search
CPC .......... G01S 19/05; G01S 19/06; G01S 19/07; G01S 19/33; G01S 19/256; G01S 19/258
USPC ............... 342/357.42, 357.73, 357.4, 357.44
See application file for complete search history.

(56) References Cited

U.S. PATENT DOCUMENTS

| | | | | |
|---|---|---|---|---|
| 5,619,211 A * | 4/1997 | Horkin et al. | ............ | 342/357.21 |
| 7,391,363 B2 * | 6/2008 | Dunas | ............ | G01S 19/05 |
| | | | | 342/357.48 |
| 7,859,453 B2 * | 12/2010 | Rowitch | ............ | G01S 19/21 |
| | | | | 342/357.21 |
| 8,054,222 B2 * | 11/2011 | van Diggelen et al. | | ............ |
| | | | | 342/357.67 |
| 8,169,366 B2 * | 5/2012 | Conroy et al. | ............ | 342/357.63 |
| 8,199,692 B2 * | 6/2012 | Trautenberg | ........ | H04B 7/18521 |
| | | | | 342/357.2 |
| 8,334,807 B2 * | 12/2012 | Gaal et al. | ............ | 342/357.73 |
| 8,456,353 B2 * | 6/2013 | Dai | ............ | G01S 19/41 |
| | | | | 342/357.24 |
| 8,542,147 B2 * | 9/2013 | Whelan | ............ | G01S 19/05 |
| | | | | 342/357.22 |
| 8,866,671 B2 * | 10/2014 | Morrison | ............ | G01S 19/256 |
| | | | | 342/357.73 |
| 2005/0090265 A1 * | 4/2005 | Abraham | ............ | G01S 5/0036 |
| | | | | 455/456.1 |
| 2006/0290566 A1 * | 12/2006 | Syrjarinne et al. | ...... | 342/357.15 |

(Continued)

OTHER PUBLICATIONS

Moudrak et al., "Timing Aspects of GPS Galileo Interoperability: Challenges and Solutions", Conference: 36 Annual Precise Time and Time Interval (PTTI) Systems and Applications Meeting, Washington, Dec. 7-9, 2004.*

(Continued)

*Primary Examiner* — Chuong P Nguyen

(74) *Attorney, Agent, or Firm* — Greenblum & Bernstein, P.L.C.

(57) ABSTRACT

Method, arrangement and system for improving a combined use of a plurality of different satellite navigation systems, in which each of the plurality of different satellite navigation systems includes a constellation of at least one satellite. The method includes broadcasting from each satellite of the constellation of a first satellite navigation system the clock models for all satellites of the constellation of a second satellite navigation system.

13 Claims, 2 Drawing Sheets

(56) References Cited

U.S. PATENT DOCUMENTS

2008/0088506 A1    4/2008  Fischer
2018/0088243 A1*  3/2018  Wang .................... G01S 19/235

OTHER PUBLICATIONS

Hahn et al., "A Report on GPS and Galileo Time Offset Coordination Efforts", Frequency Control Symposium, 2007 Joint with the 21st European Frequency and Time Forum. IEEE International, Conference Date: May 29, 2007-Jun. 1, 2007.*
Jorg H Hahn et al., "A Report on GPS and Galileo Time Offset Coordination Efforts", Frequency Control Symposium, 2007 Joint With the 21st European Frequency and Time Forum, IEEE International, IEEE, PI, XP031138002 , May 1, 2007, pp. 440-445.
Alexandre Moudrak et al., "GPS Galileo Time Offset: How It Affects Positioning Accuracy and How to Cope with it", ION GNSS. International Technical Meeting of the Satellitedvision of the Institute of Navigation, Washington, DC, US, XP002445883 , Sep. 21, 2004, pp. 664.
Bernard Bonhoure et al., "GPS—Galiled Urban Interoperability Performance With the GPS-Galileo Time Offset", Proceedings of ION GNSS 2008, XP55041658 , Sep. 16, 2008, pp. 971-981.
European Search Report conducted in counterpart European Appln. No. 120 04 513.3 (dated Oct. 25, 2012) (with English language translation).

* cited by examiner

COMBINED USE OF DIFFERENT SATELLITE NAVIGATION SYSTEMS

CROSS-REFERENCE TO RELATED APPLICATIONS

The present application claims priority under 35 U.S.C. § 119 of German Patent Application No. 10 2011 106 589.3, filed on Jun. 16, 1011, the disclosure of which is expressly incorporated by reference herein in its entirety.

BACKGROUND OF THE INVENTION

1. Field of the Invention

The invention relates to a method and an arrangement for improving the combined use of different satellite navigation systems and a receiver system for a combined use of different satellite navigation systems.

2. Discussion of Background Information

By the combined use of two different satellite navigation systems the precision, visibility and availability can be considerably improved. However, different satellite navigation systems normally use different representations of the international atomic time scale TAI (Temps Atomique International), whereby the system times of different satellite navigation systems generally differ. For example, NAVSTAR-GPS or GPS uses the GPS system time, GLONASS, however, uses the GLONASS system time differing therefrom. Another important difference lies in the geodetic reference systems, on which the satellite navigation systems are based. For example, information of the satellites with GPS are given in the World Geodetic System 1984 (WGS 84), with GLONASS in the Soviet Geodetic System 1985 (SGS 85). For a combined, in particular global use of different satellite navigation systems an equalization of the differences in the reference systems and in the time scales is therefore necessary in order to obtain the most exact positioning solutions.

The differences between the reference systems are normally relatively small compared to the difference in the system times. It is therefore provided for a combined use of GPS and the future European satellite navigation system Galileo only to broadcast a model for the difference between the system times of the two systems. However, even after taking this model into consideration, the error that is caused by the different time systems is still significant. For a combined use of GPS and Galileo, but also quite generally of different satellite navigation systems, to achieve the most exact possible position determination, it is accordingly important to reduce this error.

SUMMARY OF THE INVENTION

Embodiments of the present invention improve a combined use of different satellite navigation systems.

According to embodiments, in a method for the combined use of different satellite navigation systems, each satellite of a constellation of a first satellite navigation system broadcasts the clock models for all satellites of the constellation of a second satellite navigation system, and in an arrangement for the combined use of different satellite navigation systems, which performs an embodiment of the method, each satellite of the constellation of a first satellite navigation system broadcasts the clock models for all satellites of the constellation of a second satellite navigation system. Further, in other embodiments, a receiver system for a combined use of different satellite navigation systems receiver system is embodied to receive navigation signals of the satellites of the first and second satellite navigation system and to evaluate the navigation information that is contained in the received navigation signals of the satellites of the first and second satellite navigation system, taking the clock models into consideration.

A concept on which embodiments of the invention is based is that, for the combined use of two different satellite navigation systems, it would be optimal if each satellite navigation system determined and broadcast the ephemerides and clock models for the satellites of the other system in its own reference system in order to increase the precision of a position solution with a combined use of different satellite navigation systems, such as, e.g., GPS and Galileo. Because of tolerable lengths of time intervals for the transmission of the information, a satellite cannot transmit the information for the entire constellation. Thus, this information could be divided up and distributed among different satellites. However, this would mean that it is no longer sufficient to receive information from just one satellite of one's own constellation if the object is to use satellite navigation systems in a combined manner. Therefore, in embodiments, each satellite of the constellation of a satellite navigation system broadcasts only the clock models for all satellites of the constellation of a different satellite navigation system, but does not transmit orbit models, since it is to be assumed that the reference systems of the satellite navigation systems are coordinated so well with one another that they can be assumed to be identical for the desired accuracy. Due to the reduction of the broadcast of information to the clock models, a transmission of the information for the respectively other constellation is possible via each individual satellite of one's own constellation.

According to embodiments, a method is provided for improving the combined use of different satellite navigation systems, in which each satellite of the constellation of a first satellite navigation system broadcasts the clock models for all satellites of the constellation of a second satellite navigation system.

Furthermore, each satellite of the constellation of the second satellite navigation system can broadcast the clock models for all satellites of the constellation of the first satellite navigation system.

In particular, the first satellite navigation system is Galileo and the second satellite navigation system is NAVSTAR-GPS.

The broadcast of the clock models is carried out in particular with navigation signals of the first or second satellite navigation system at predetermined time intervals.

The broadcast of the clock models can be monitored by at least one monitoring station of the ground segment of the respective satellite navigation system.

Furthermore, the monitoring stations can be controlled by a central unit, which coordinates the broadcast of the clock models via the monitoring stations.

In further embodiments, an arrangement is provided for improving the combined use of different satellite navigation systems with an above-described embodiment of the method, in which each satellite of the constellation of a first satellite navigation system broadcasts the clock models for all satellites of the constellation of a second satellite navigation system.

The arrangement can have at least one monitoring station of the ground segment of the respective satellite navigation system, which is embodied for monitoring the broadcast of clock models.

The arrangement can furthermore have a central unit, which is embodied for the control of the monitoring stations and the coordination of the broadcast of the clock models via the monitoring stations.

Further embodiments of the invention relate to a receiver system for a combined use of different satellite navigation systems, in which an above-described embodiment of the method is performed so that each satellite of the constellation of a first satellite navigation system broadcasts the clock models for all satellites of the constellation of a second satellite navigation system and the receiver system is embodied to receive navigation signals of the satellites of the first and second satellite navigation system and to evaluate the navigation information that is contained in the received navigation signals of the satellites of the first and second satellite navigation system, taking the clock models into consideration.

Embodiments of the invention are directed to a method for improving a combined use of a plurality of different satellite navigation systems, in which each of the plurality of different satellite navigation systems includes a constellation of at least one satellite. The method includes broadcasting from each satellite of the constellation of a first satellite navigation system the clock models for all satellites of the constellation of a second satellite navigation system.

According to embodiments, the method can also include broadcasting from each satellite of the constellation of the second satellite navigation system the clock models for all satellites of the constellation of the first satellite navigation system.

In accordance with other embodiments of the instant invention, the first satellite navigation system can be a Galileo navigation system and the second satellite navigation system may be a NAVSTAR-GPS system.

According to still other embodiments of the invention, the broadcasting of the clock models can be carried out with navigation signals of the first satellite navigation system at predetermined time intervals.

Moreover, the method can also include monitoring the broadcasting of the clock models via at least one monitoring station of a ground segment of at least one of the first and second satellite navigation system. The at least one monitoring station can include a plurality of monitoring stations controlled by a central unit that coordinates the broadcasting of the clock models via the plurality of monitoring stations.

Embodiments of the present invention are directed to an arrangement for improving the combined use of different satellite navigation systems, in which a first satellite navigation system includes a first constellation having at least one first satellite and a second satellite navigation system includes a second constellation having at least one second satellite. The arrangement includes that each at least one first satellite of the first constellation of a first satellite navigation system is structured and arranged to broadcast clock models for all second satellites of the second constellation of a second satellite navigation system.

According to embodiments, at least one first monitoring station of a first ground segment of the first satellite navigation system can be is structured and arranged to monitor the broadcasting of clock models of the at least one first satellite. Further, at least one second monitoring station of the second ground segment of the second satellite navigation system may be structured and arranged to monitor the broadcasting of the clock models of the at least one second satellite. Still further, a central unit can be structured and arranged to control the at least one first monitoring station and the at least one second monitoring station and to coordinate the broadcast of the clock models via the at least one first and second monitoring stations.

Embodiments of the invention are directed to a receiver system for a combined use of a plurality of different satellite navigation systems, in which each of the plurality of different satellite navigation systems includes a constellation of at least one satellite. The receiver system includes a receiver structured and arranged to receive navigation signals from the at least one satellite of a first satellite navigation system and from the at least one satellite of a second navigation systems, and to receive clock models for all satellites of the second satellite navigation system broadcast from each at least one satellite of the first satellite navigation system, and a processor structured and arranged to consider the clock models in evaluating navigation information contained in the received navigation signals of the satellites of the first and second satellite navigation systems.

According to embodiments of the instant invention, the processor, in evaluating the navigation information, may determine a current location of the receiver. Further, a display may be structured and arranged to display the current location of the receiver.

In accordance with other embodiments, the processor in evaluating the navigation signals can consider orbit models of the first and second satellite navigation systems to be identical.

Embodiments of the invention are directed to a system for use with a combination a plurality of different satellite navigation systems, in which each of the plurality of different satellite navigation systems includes a constellation of at least one satellite. The system includes a first ground segment monitoring station associated with a first satellite navigation system being structured and arranged to receive first clock models from the least one satellite of a first satellite navigation system, and a second ground segment monitoring station associated with the second satellite navigation system being structured and arranged to transmit the first clock signals to the at least one satellite of the second satellite navigation system and to actuate all of the satellites of the second satellite navigation system to broadcast the first clock signals with the navigation signals of the second satellite navigation system.

According to embodiments, the system may further include a control unit structured and arranged to monitor the first ground segment monitoring station and the second ground segment monitoring station. The control unit can be structured and arranged to monitor the first clock signals received by the first ground segment monitoring station and to transmit the first clock signals to the second ground segment monitoring station. Additionally or alternatively, the control unit may be structured and arranged to instruct the second ground segment monitoring station to transmit the first clock signals to the at least one satellite of the second navigation system and to actuate all of the satellites of the second navigation system to broadcast the first clock signals with the navigation signals of the second satellite navigation system.

In accordance with still yet other embodiments of the present invention, the second ground segment monitoring station can be further structured and arranged to receive second clock models from the least one satellite of a second satellite navigation system; and the first ground segment monitoring station is further structured and arranged to transmit the second clock signals to the at least one satellite of the first satellite navigation system and to actuate all of the satellites of the first satellite navigation system to broadcast the second clock signals with the navigation signals of the first satellite navigation system. Moreover, the system can also further include a control unit structured and arranged to monitor the first ground segment monitoring station and the second ground segment monitoring station, such that the control unit can be structured and arranged to monitor the second clock signals received by the second ground segment monitoring station and to transmit the second clock signals to the first ground segment monitoring station, and the control unit may be structured and arranged to instruct the first ground segment monitoring station to transmit the second clock signals to the at least one satellite of the first navigation system and to actuate all of the satellites of the first navigation system to broadcast the second clock signals with the navigation signals of the first satellite navigation system.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the following description the same, functionally the same and functionally related elements can be provided with the same reference numbers. Absolute values are given below merely by way of example and are not to be understood to restrict the invention.

Figure 1:
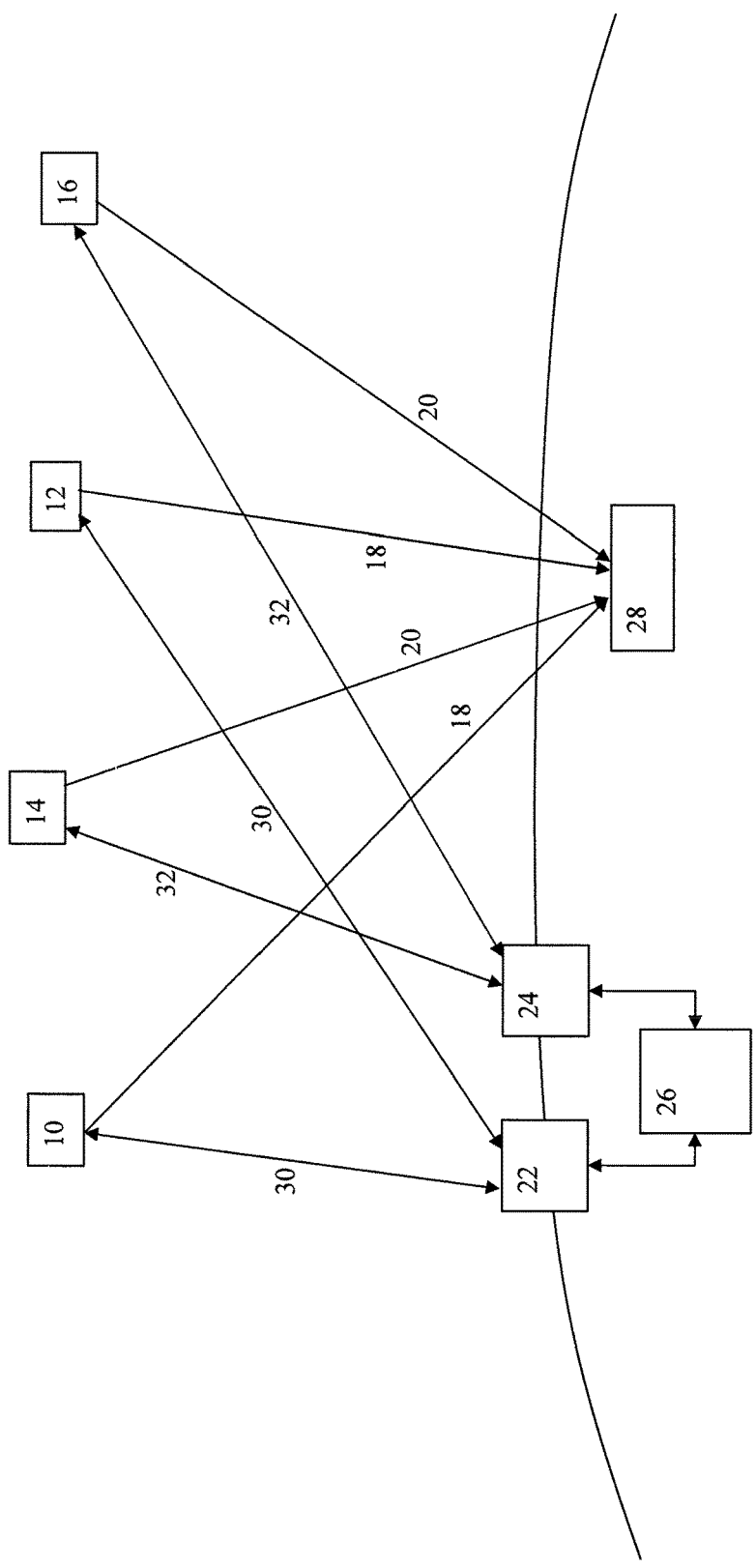
FIG. 1 illustrates an exemplary embodiment of an arrangement with a first and a second satellite navigation system and units of the ground segments of the satellite navigation systems for the control and coordination of the broadcast of clock models of the satellites.

FIG. 1 shows a constellation with several satellites 10, 12, 14 and 16 of a first and second satellite navigation system, e.g., NAVSTAR-GPS and Galileo. The satellites 10 and 12 here belong to the first satellite navigation system, the satellites 14 and 16 belong to the second satellite navigation system. A monitoring station 22 of the ground segment of the first satellite navigation system can communicate with the satellites 10 and 12 via communication connections 30. Likewise, a monitoring station 24 of the ground segment of the second satellite navigation system can communicate with the satellites 14 and 16 via communication connections 32. The two monitoring stations 22 and 24 are connected in terms of communications to a central unit 26, which not only controls the monitoring stations 22 and 24, e.g., their communication with the respective satellites, but can also coordinate the broadcast of clock models via the monitoring stations 22 and 24. In principle, however, it should be understood that the broadcast of the clock models can also be carried out without a coordination of this type.

In accordance with the exemplary embodiment to improve the combined use of the different satellite systems, a receiver system 28 is provided to receive the navigation signals 18 emitted by the satellites 10 and 12 of the first satellite navigation system and the navigation signals 20 emitted by the satellites 14 and 16 of the second satellite navigation system. Moreover, according to embodiments, navigation signals 18 and 20 are broadcast together with, e.g., embedded in the scope of the navigation signals, the clock models of all satellites of a satellite navigation system, e.g., satellites 10 and 12, by each satellite of the other satellite navigation system, e.g., satellites 14 and 16. With the constellations shown, the clock models of satellites 10 and 12 of the first satellite navigation system can thus be broadcast by satellites 14 and 16 of the second satellite navigation system. Of course, this can also be carried out in a vice versa manner. Likewise, it is understood that, in principle, the satellites of both satellite navigation systems can transmit the clock models of the satellites of the respectively other satellite navigation system. The broadcast of the clock models makes it possible for receiver system 28 to advantageously use the navigation signals of all satellites, taking into consideration the broadcast clock models received with the navigation signals.

As already mentioned above, the central unit 26 can coordinate the broadcast of the clock models so that, e.g., it receives information from the ground segments of the satellite navigation systems regarding the clocks of the satellites and the clock models and it monitors and controls monitoring stations 22 and 24 to actuate satellites 10, 12 and/or 14, 16, respectively, to broadcast the clock models stipulated by central unit 26. Thus, it can be ensured that the most current possible clock models are broadcast by satellites 10, 12 and/or 14,16. For example, central unit 26 can receive information on the clock models of satellites 10 and 12 from the ground segment of the first satellite navigation system, e.g., continuously, periodically or when changes occur, and according to the information received, transmit the current clock models of satellites 10, 12 to monitoring station 24 and instruct monitoring station 24 to transmit the current clock models of satellites 10, 12 to satellites 14 and 16 via communication connections 32, so that they are broadcast with navigation signals 20 emitted by satellites 14 and 16. However, it is understood that this type of coordination via the ground segment is not absolutely essential.

Figure 2:
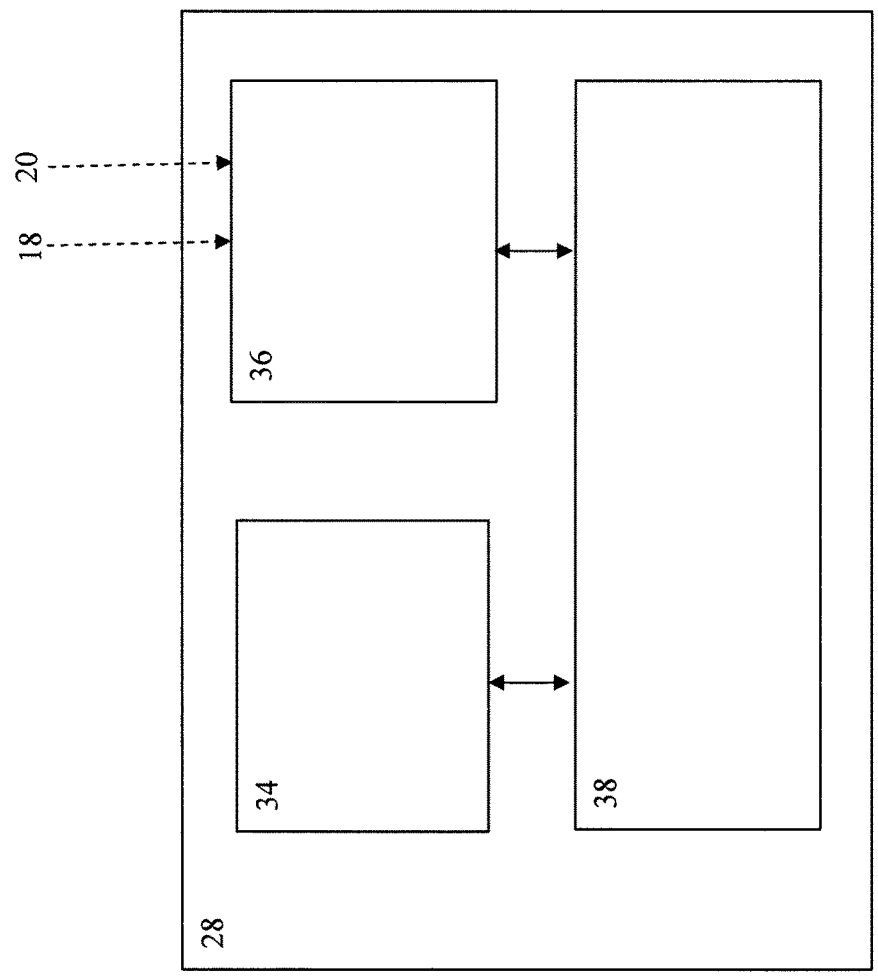
FIG. 2 illustrates an exemplary embodiment of a receiver system for the combined use of two satellite navigation systems.

FIG. 2 shows a block diagram of a receiver system 28, which is embodied or formed for the combined use of two different navigation systems.

To this end, receiver system 28 has a receiver unit 36, which can receive the navigation signals 18 and 20 from the first and second satellite navigation systems, as shown in FIG. 1. Receiver unit 36 has an antenna that is adjusted to the reception of signals 18 and 20 typically transmitted in different frequency ranges, and high frequency units for amplifying, filtering and mixing received signals 18 and 20. Furthermore, receiver 36 contains a signal processor for correlating and decoding signals 18 and 20. Moreover, receiver unit 36 conveys the information contained in received signals 18 and 20 to a processor 38 for processing.

Processor 38 is set up such that it can determine the current position of receiver system 28 and display it via a display 34 based on the information received. Processor 38 to this end is configured by corresponding firmware such that it calculates the position, time etc. based on the data transmitted by the satellites with signals 18 and 20. In the calculation it uses the data of satellites 10, 12 of the first satellite navigation system as well as of satellites 14 and 16 of the second satellite navigation system. It is hereby assumed in the orbit models of the first and second satellite navigation system that the reference systems conform to one another such that they can be considered to be identical for a desired accuracy. In the combined use of the data of the two satellite navigation systems, the processor takes into account however the clock models contained in the data of the satellites of the respective satellite navigation systems.

With the present invention, the combined use of different satellite navigation systems can be improved with reasonable technical expenditure.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

| | |
|---|---|
| 10, 12 | Satellite of a first satellite navigation system |
| 14, 16 | Satellite of a second satellite navigation system |
| 18 | Navigation signals from satellites 10, 12 of the first satellite navigation system |
| 20 | Navigation signals from satellites 14, 16 of the second satellite navigation system |
| 22 | Monitoring station of the ground segment of the first satellite navigation system |
| 24 | Monitoring station of the ground segment of the second satellite navigation system |
| 26 | Central unit for the coordination of the broadcast of clock models via the monitoring stations 22, 24 |
| 28 | Receiver system for combining of the first and second satellite navigation system |
| 30 | Communication connection between the monitoring station 22 of the ground segment of the first satellite navigation system and the satellites 10, 12 |
| 32 | Communication connection between the monitoring station 24 of the ground segment of the second satellite navigation system and the satellites 14, 16 |
| 34 | Display |
| 36 | Receiver unit for navigation signals |
| 38 | Processor |

What is claimed:

1. An arrangement for improving a combined use of different satellite navigation systems, in which a first satellite navigation system includes a first constellation having at least one first satellite and a second satellite navigation system includes a second constellation having at least one second satellite, the arrangement comprising:
    each at least one first satellite of the first constellation of the first satellite navigation system is structured and arranged to broadcast clock models for all second satellites of the second constellation of the second satellite navigation system, and
    each at least one second satellite of the second constellation of the second satellite navigation system is structured and arranged to broadcast clock models for all first satellites of the first constellation of the first satellite navigation system,
    whereby the at least one first and satellites of respective first and second satellite navigation systems are configured to transmit the clock models of the satellites of the respective other satellite navigation system.

2. The arrangement according to claim 1, further comprising at least one first monitoring station of a first ground segment of the first satellite navigation system that is structured and arranged to monitor the broadcasting of clock models of the at least one first satellite.

3. The arrangement according to claim 2, further comprising at least one second monitoring station of the second ground segment of the second satellite navigation system that is structured and arranged to monitor the broadcasting of the clock models of the at least one second satellite.

4. The arrangement according to claim 3, further comprising a central unit structured and arranged to control the at least one first monitoring station and the at least one second monitoring station and to coordinate the broadcast of the clock models via the at least one first and second monitoring stations.

5. A receiver system for a combined use of a plurality of different satellite navigation systems, in which each of the plurality of different satellite navigation systems includes a constellation of at least one satellite, comprising:
    a receiver structured and arranged to receive navigation signals from the at least one satellite of a first satellite navigation system and from the at least one satellite of a second navigation system, to receive clock models for all satellites of the second satellite navigation system broadcast from each at least one satellite of the first satellite navigation system, and to receive clock models for all satellites of the first satellite navigation system broadcast from each at least one satellite of the second satellite navigation system, whereby the satellites of the first and second satellite navigation systems are configured to transmit the clock models of satellites of the respective other satellite navigation system; and
    a processor configured to consider the received clock models in evaluating navigation information contained in the received navigation signals of the satellites of the first and second satellite navigation systems.

6. The receiver system according to claim 5, wherein the processor, in evaluating the navigation information, determines a current location of the receiver.

7. The receiver system according to claim 6, further comprising a display structured and arranged to display the current location of the receiver.

8. The receiver system according to claim 5, wherein the processor in evaluating the navigation signals considers orbit models of the first and second satellite navigation systems to be identical.

9. A system for use with a combined plurality of different satellite navigation systems, in which each of the plurality of different satellite navigation systems includes a constellation of at least one satellite, the system comprising:
- a first ground segment monitoring station associated with a first satellite navigation system being structured and arranged to receive first clock models from the least one satellite of the first satellite navigation system;
- a second ground segment monitoring station associated with a second satellite navigation system being structured and arranged to receive second clock models from the least one satellite of the second satellite navigation system; and
- a control unit, which is coupled to the first and second ground segments, is configured to transmit the first clock signals to the second ground segment monitoring station, to transmit the second clock signals to the first ground segment monitoring station, to control the first ground segment monitoring station to actuate all of the satellites of the first satellite navigation system to broadcast the second clock signals with the navigation signals of the first satellite navigation system, and to actuate all of the satellites of the second satellite navigation system to broadcast the first clock signals with the navigation signals of the second satellite navigation system.

10. The system according to claim 9, wherein the control unit is further structured and arranged to monitor the first ground segment monitoring station and the second ground segment monitoring station.

11. The system according to claim 10, wherein the control unit is structured and arranged to monitor the first clock signals received by the first ground segment monitoring station.

12. The system according to claim 9, wherein
the first ground segment monitoring station is further structured and arranged to transmit the second clock signals to the at least one satellite of the first satellite navigation system.

13. The system according to claim 12, wherein the control unit is further structured and arranged to monitor the first ground segment monitoring station and the second ground segment monitoring station,
wherein, before transmitting the second clock signals to the first ground segment monitoring station, the control unit is structured and arranged to monitor the second clock signals received by the second ground segment monitoring station, and
wherein the control unit is structured and arranged to instruct the first ground segment monitoring station to transmit the second clock signals to the at least one satellite of the first navigation system.

* * * * *